June 26, 1962 C. E. LOMAX 3,041,405

LINE CIRCUIT WITH TWO-WAY TRANSFER

Filed Dec. 8, 1958 2 Sheets-Sheet 1

INVENTOR.
CLARENCE E. LOMAX

BY C. A. Gulbrandsen

ATTY.

June 26, 1962

C. E. LOMAX 3,041,405

LINE CIRCUIT WITH TWO-WAY TRANSFER

Filed Dec. 8, 1958

2 Sheets-Sheet 2

INVENTOR.
CLARENCE E. LOMAX

BY C. A. Gulbrandsen

ATTY

United States Patent Office 3,041,405

Patented June 26, 1962

3,041,405

LINE CIRCUIT WITH TWO-WAY TRANSFER

Clarence E. Lomax, Hastings, Nebr., assignor to Automatic Electric Laboratories, Inc., a corporation of Delaware Filed Dec. 8, 1958, Ser. No. 779,011
11 Claims. (Cl. 179—18)

Figure 1:
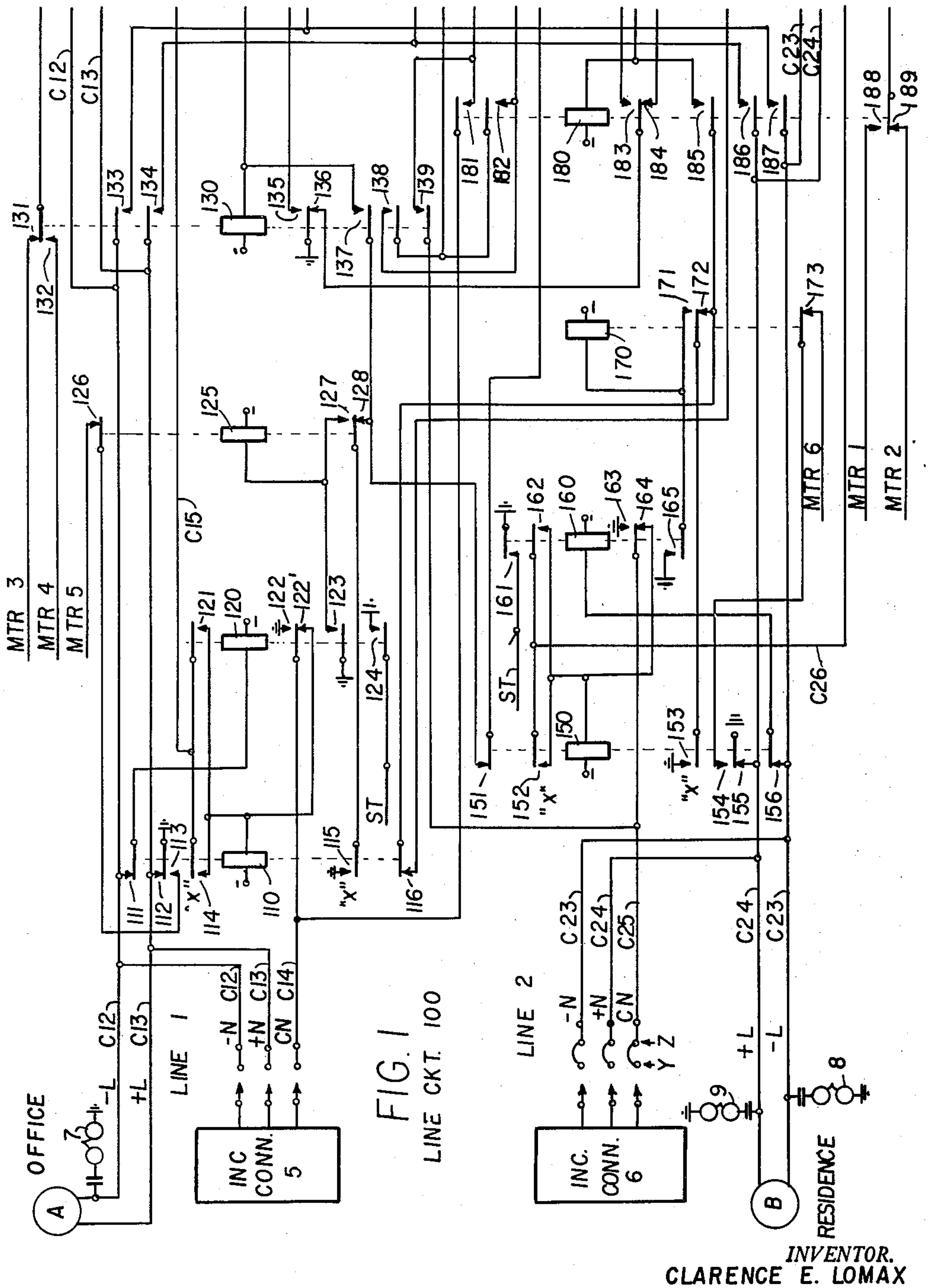

The present invention relates in general to telephone systems, but more particularly to an arrangement for giving a telephone subscriber a special type of service referred to as "transfer service." A service of this type is shown in Patent No. 2,095,712, issued to Edward S. Peterson on October 12, 1937, whereby a subscriber having this service is able to bring about a switching operation at the exchange, in effect for any desired period, which causes all calls intended for his telephone to be diverted to another telephone.

Doctors who do not have private secretaries and who cannot subscribe to public secretarial service are typical examples of telephone subscribers who need line transfer service. They have a telephone at their office, a telephone at their residence, and the two telephones are on separate lines with two separate listed directory numbers. This arrangement is required so that both phones can be used simultaneously for either incoming or outgoing calls. In the above-mentioned Peterson patent, if the doctor leaves his office to return to his residence, before leaving the office he operates a key to operate a transfer relay in the exchange to transfer all calls to his residence phone. Thus, only the residence telephone would ring on calls incoming to the office.

It is an object therefore of this invention to provide two telephone lines both of which have full automatic service and a timing means for timing a call to the first line to cause the second line to be connected with it after a fixed period if the party on the first line does not answer and if the second line is not busy.

It is another object of this invention to provide two telephone lines which both have full automatic service and a timer means for a call to the first line to start measuring time when it is called so as to later connect the second line with it, but including a means to stop the timer if the second line becomes busy, and to again start the timer if the second line becomes free before the party on the first line answers.

It is a further object of this invention to provide two lines which have full automatic service and a means for each line to connect the other line to it after a fixed period if the call to it is not answered and if the other line is not busy.

It is a still further object of this invention to provide a residence line having two call directory numbers and two ringers at the same location, one ringer responding to calls from the first call number and the other to calls from the second call number, an office line having another call number, both lines having full automatic service, an understanding that the first ringer on the first line indicates that a certain person is wanted, and a means whereby the party on the first line can let the call go unanswered if the first ringer rings so that in due time the call will be transferred to the second line where it is known that the wanted party is located.

Figure 2:
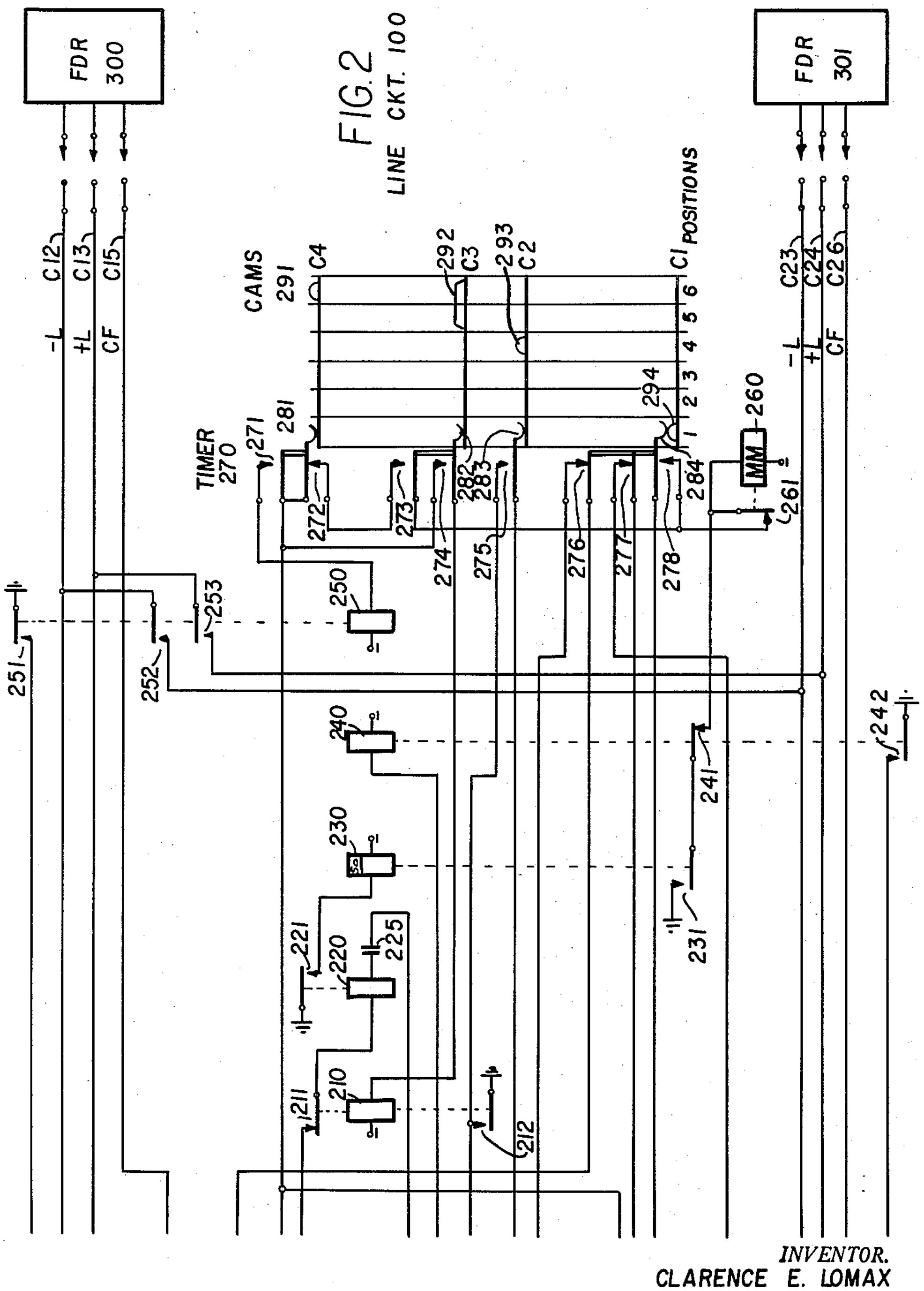

Other objects and advantages will become apparent from a perusal of the following specification taken in combination with the accompanying drawings of which;

FIGS. 1 and 2, with FIG. 2 placed to the right, shows the apparatus involved and the manner in which it is installed in a typical telephone system.

Referring to the drawings, the reference letter A represents an automatic telephone station assumed to be at the office of a subscriber having the transfer service. B is the residence telephone or any other telephone to which calls are to be transferred to or transferred from. The drawings, in greater detail, disclose a telephone line circuit 100 common to Line 1 and Line 2, which are in turn individually connected to stations A and B respectively. The line circuit 100 comprises two sets of line, cut-off, and transfer control relays, with one set for each line, namely relays 110, 120, 125, and 130 for Line 1, and relays 150, 160, 170, and 180 for Line 2. Also, a plurality of transfer relays 210, 220, 230, 240, and 250 are common to both lines, as well as a timer 270. The timer 270 comprises a motor magnet 260, which steps a plurality of cams C1–C4 one step for each deenergization. A plurality of vertical lines associated with the timer 27 designates six different stepped positions 1–6 of the cams, with each cam having a lug such as lug 294 on cam 1, engaging and disengaging a cam spring such as spring 284, only at certain stepped positions. The springs, in turn, control certain spring contacts.

The office station A has a ringer 7 connected to the negative side of the line to respond to a ringing frequency from a connector such as 5 with the office station A having a single directory call number on a terminal-per-station basis. The residence station B on the other hand has two ringers 8 and 9 with divided ringing and two directory call numbers for the one residence line. The connector bank terminals Y designating a call number for ringing over the negative side of the line to ring ringer 8, and a second set of bank terminals Z designating a second call number for ringing over the positive side of the line to ring ringer 9. The two ringers at residence station B designate, one call number and one ringer 8 for doctor's calls, and the other call number and ringer 9 is only for normal residence calls. In the detailed explanation to follow, if the doctor's ringer 8 should ring and if it were known that the doctor was in his office, the call need not be answered, but a resident could wait for the timer 270 to transfer the call to the office station A. This would be advantageous to the patients in exchanges where metered service is used because the doctor, by paying for the transfer service, could save the patient the expense of a second call.

The timer 270, and more particularly the motor magnet 260, is pulsed one time for each ringing period received over either one of the lines providing the other line is not busy, whereby, if after four ringing periods the called line does not answer, the call will be transferred to the other line and a ringer at both stations will ring simultaneously responsive to all ringing periods received thereafter. However, it should be pointed out that normal residential calls not answered after four ringing periods would also transfer the call to the office line, but since this ringing comes over the positive side of the line, the ringer at the office station B would not respond because it is connected to the negative side of the line. This last case is to prevent unnecessary disturbances of the doctor since he may be busy with patients, and since these calls were not intended for him anyway.

A plurality of meters are provided to meter calls for both Line 1 and Line 2. Only the leads extending to these meters are shown, and are for the following:

MTR1 for metering failures or delay in transferring to Line 1

MTR2 for metering failures or delay in transferring to Line 2

MTR3 for metering calls transferred to Line 1

MTR4 for metering calls transferred to Line 2

MTR5 for totalizing incoming calls to Line 1

MTR6 for totalizing incoming calls to Line 2

By means of these meters the traffic load can be determined, such as a high reading of meter 1 and low reading of meter 3 indicates that many attempts to transfer to Line 1 are unsuccessful because Line 1 is busy too much of the time. If, under these conditions, meter 5 has a low reading, it indicates that outgoing calls from Line 1 are the cause of it being busy much of the time.

A more detailed explanation will now follow:

Assuming that the subscriber at the office Station A wishes to make an outgoing call, the removal of the handset closes a loop through the hook switch (not shown) to operate relay 120. The circuit extending from battery, winding of relay 120, contacts 111, negative conductor C12, through the caller's loop, positive conductor C13, to ground at contacts 112. At contacts 121, relay 120 closes battery via the winding of relay 110 to the control conductor C15 extending to the finder 300. At contacts 122, ground is closed to mark Station A busy on the incoming connector bank via control conductor C14. Contacts 123 close an obvious circuit to relay 125. At contacts 124 ground is closed to the ST lead to start the line finder 300 to search for and find the marked line. Relay 125 operates, opens at contacts 126 a prepared circuit to an incoming call totalizer meter. At contacts 127 relay 125 prepares a locking circuit for itself. When the calling line is found by the line finder, such as finder 300, ground is closed over the finder control lead C15 in a well-known manner to operate the cut-off relay 110. Relay 110 in operating closes its "X" contacts first, closing at "X" contacts 115 a holding circuit to relay 125, and at "X" contacts 114 closes a holding circuit for relay 110. Thereafter, contacts 111 and 112 open the circuit to relay 120, contacts 113 prepares ground to the incoming call totalizer meter for Line 1. Contacts 116 opens a prepared circuit to relay 180. Relay 120 restores, opening at contacts 121 the original operating circuit to relay 110. However, as mentioned, relay 110 locked operated over its "X" contacts 114. Contacts 122 opens ground to control lead C14. However, at contacts 122′ ground is replaced via control lead C15 from the finder. A selector switch (not shown) would be linked to the finder 300 and would return dial tone in a well-known manner, and the calling party at his office Station A would dial the desired directory number to extend the call in a well-known manner over a switch train.

Assuming that the same subscriber, when at his place of residence, wishes to make a call from his residence Station B, the removal of the handset closes a loop through the hookswitch to operate relay 160. The circuit extending from battery, winding of relay 160, contacts 156, negative conductor C23, through the caller's loop, positive conductor C24, contacts 155 to ground. At contacts 161 relay 160 closes ground to the finder start lead ST to start the finder in search of the marked line, which is marked via battery through the winding of relay 150, contacts 162 being closed, and control conductor C26 to the finder bank. Contacts 163 closes ground to the incoming connector bank via conductor C25 to mark Station B busy to incoming calls. Contacts 165 close an obvious circuit to relay 170. Relay 170 operates, closing contacts 171 to prepare a holding circuit for itself. Contacts 173 opens a prepared circuit to the incoming totalizer meter for Line 2. When the marked line is found by the finder such as finder 301, ground is returned over control conductor C26 to operate relay 150. Relay 150 upon operating, operates its "X" contacts first, closing at "X" contacts 152 a locking circuit for itself, and at "X" contacts 153 closes a holding circuit to relay 170. Thereafter, contacts 155 and 156 opens the circuit to relay 160. Relay 160 restores, opening contacts 161 to stop the finder. A selector switch (not shown) linked with finder 301 would return dial tone in a well-known manner, and the calling party would proceed to dial the desired directory number to extend the call in a well-known manner over a switch train.

Assuming that an incoming call to the office Station A via incoming connector 5 has been initiated, should this line be idle, the control wiper of connector 5 would engage battery on the connector terminal extending via conductor C14, contacts 122′, and winding of relay 110. Relay 110 would operate from ground in the connector 5 to operate its "X" contacts first; however, contacts 114 would close but would be ineffective on incoming calls. The "X" contacts 115 would close a circuit to relay 130 providing the residence line telephone at station B is not in use. Assuming it is not in use, the circuit to relay 130 would extend from ground, contacts 115, 128, 151, the timer spring contacts 276, winding of relay 130 to battery. Thereafter, contacts 111 would open to prevent any false operation of relay 120. Contacts 113 closes ground via contacts 126 and conductor MTR5 to operate the incoming call totalizer meter to register an incoming call to Line 1. If the residence line was in use at this time, relay 150 would be operated and contacts 151 would be open to prevent operation of relay 130. Assuming, however, that relay 130 does operate, contacts 132 would close to prepare a circuit to the "transfer to Line 2" meter. At contacts 133 and 134 a circuit to ringing relay 220 is prepared. At contacts 135 circuits are prepared to relay 250 and motor magnet 260. Contacts 137 close a locking circuit to relay 130 via contacts 128 and 115. Contacts 138 and 139 close to prepare a circuit to relay 240.

Upon receipt of the ringing over the negative side of the line, the ringer 7 at Station A would respond and ringing relay 220 would respond to the generator over a circuit including negative conductor C12, contacts 133, 211, winding of relay 220, capacitor 225, contacts 134, and over the positive conductor C13. Relay 230 is slow-to-operate so that it will not respond to any momentary flash which it might receive from ringing relay 220 closing contacts 221, and this makes it slow-to-operate so that it will operate only once for each ringing period. Relay 230 operating, closes ground to motor magnet 260 via contacts 241, to cause energization thereof. However, motor magnet 260 is of the type that steps on deenergization so that it will not advance the cams of timer 270 until the end of the ringing period, at which time relays 220 and 230 restore to open contacts 231. At the end of the first ringing period, the motor magnet will have stepped the cams C1–C4 of timer 270 from the first position to position 2 as designated in vertical lines in FIG. 2 whereby springs 281, 282, and 283 will not be affected, but spring 284 will disengage lug 294. This last disengagement will open cam spring contacts 276 and open the operating circuit to relay 130, however, relay 130 remains operated over its mentioned locking circuit. Cam spring contacts 277 open a prepared circuit to relay 180, and cam contacts 278 prepares a self-interrupter circuit to motor magnet 260.

Should the call be answered promptly by the subscriber at Station A, ringing will cease and ringing relay 220 cannot operate. This prevents the motor magnet 260 from advancing the cams C1–C4 any further. At this time, conversation will be taking place between the calling party and the called party at substation A. However, if the ringing continues, the cams C1–C4 will advance one step for each cessation of ringing periods. If, after four ringing periods are had and the called party still hasn't answered, the cams C1–C4 will be in their respective fifth positions, whereby cam spring 282 will engage lug 292 on cam C3, closing cam contacts 274 to operate ring cut-off relay 210 via ground at contacts 135. Also, cam contacts 273 close a self-interrupted circuit to motor magnet 260; the circuit extending from battery, winding of motor magnet 260, contacts 261, 273, 272, 135 to ground. Relay 210 operating opens at contacts 211 the ringing circuit to relay 220 so that it can no longer operate relay 230 to energize the motor magnet 260. At contacts 212 ground is closed via contacts 139 and control conductor C25 to busy the connector bank corresponding to Line 2, and operates relay 150 via contacts 164. Relay 150, in operating, opens contacts 155 and 156 to prevent any false operations of relay 160, and at contacts 154 closes ground via contacts 173 and conductor MTR6 to the incoming call totalizer meter for Line 2 to register the call. Motor magnet 260, by means of its self-interrupter contacts 261, will deenergize motor magnet 260 and step the cams C1–C4 to the sixth position, whereby cam spring 281 of cam C4 will engage lug 291. This last engagement will cause contacts 272 to open the self-interrupter circuit to motor magnet 260. Cam contacts 271 will close an obvious circuit to transfer relay 250. Relay 250 operates closing at contacts 251 a circuit to the "transfer to Line 2" meter for metering purposes via contacts 132 and conductor MTR4. At contacts 252 and 253, Line 1 is connected to Line 2 so that the fifth ringing period will now ring both lines and whichever line is the first to answer will cut off the ringing. Since this ringing took place over the negative side of the line, only ringer 8 at Station B would have responded in series with ringer 7.

When the call is terminated and the switch train is released, ground is removed from CN lead C14 on Line 1 to open the circuit to relay 110. Relay 110 restores, opening at "X" contacts 115 the locking circuit to relay 130. Relay 130 restores, opening at contacts 135 the circuit to relays 210 and 250. Relay 210 restores, opening at contacts 212 the circuit to relay 150, and also removes busy ground from CN lead C25 to avail Line 2 for seizure. Relay 250 restores to disconnect Line 1 from Line 2 at contacts 252 and 253. At contacts 136 ground is closed via contacts 184, 278, and 261 and through the winding of motor magnet 260 to battery, to cause energization thereof. Motor magnet 260, by means of its self-interrupter contacts 261, will interrupt its circuit to deenergize motor magnet 260 to step the cams C1–C4 to their respective normal position, namely position 1. The timer switch 270 returning to position 1 will actuate spring 284 to open the interrupter circuit to motor magnet 260 at contacts 278.

If Line 2 is idle when Line 1 is called, but becomes busy after relay 130 is operated, and before cams C1–C4 reach position 5, ground on CN lead C25 will operate relay 240 when the timer switch 270 gets to position 4. This last circuit extending from battery, winding of relay 240, contacts 138, contacts 275 (spring 283 engaging lug 293), 139 to ground on CN lead C25. Relay 240, in operating, opens contacts 241 so that the pulsing circuit to motor magnet 260 is opened and the timer switch 270 will not respond to the fourth ringing period. Thus, the timer switch 270 is prevented from advancing so that Line 1 is not connected to Line 2 when Line 2 is busy. Contacts 242 closes ground to the transfer failure meter via contacts 189 and conductor MTR2 to register a failure or delay in transferring a call to Line 2. If the party calling Line 1 should hang up without the call being answered and while Line 2 is still busy, relays 110 and 130 will release in a manner previously described. Relay 130, in restoring, opens contacts 138 and 139 to open the circuit to relay 240. At contacts 136 relay 130 will close a self-interrupter circuit to motor magnet 260 to home the timer switch. Relay 180 being the equivalent of relay 130 with respect to Line 2 cannot operate while the timer switch 270 is homing because cam 1 has the circuit opened. Relays 210 and 220 cannot operate either because neither relay 130 nor 180 are operated. However, if the party calling Line 1 waits for an answer until Line 2 is free, removal of ground from CN lead C25 of Line 2 will permit relay 240 to restore. The restoration of relay 240 would then let relay 220 close the pulsing circuit to motor magnet 260 at the next ringing period to initiate the transfer previously described.

A transfer of a call from Line 2 to Line 1 is made in the same general manner as calls transferred from Line 1 to Line 2. As mentioned, the residence station has two directory call numbers. Assuming first a business call to the doctor, an incoming call having the last digit corresponding to the bank contacts Y on connector 6, battery encountered on the control contact by the connector wiper will close ground over CN conductor C25 to operate relay 150. Relay 150 operating closes its "X" contacts first, whereby a circuit is closed to relay 180 via ground, "X" contacts 153, contacts 172, 116, 277, winding of relay 180 to battery. Thereafter, contacts 151 open a prepared circuit to relay 130. Contacts 154 close a circuit via contacts 173 and conductor MTR6 to the incoming call totalizer meter for Line 2. Relay 180 operates closing contacts 181 and 182 to prepare a circuit to relay 240. Contacts 183 close to prepare a circuit to transfer relay 250. At contacts 185 relay 180 closes a locking circuit for itself via contacts 172 and 153. Contacts 186 and 187 close to connect ringing relay 220 to the incoming loop conductors C24 and C25 in series with the called party's ringer 8 at Station B. Contacts 188 close to prepare a circuit to the transfer failure meter over conductor MTR1.

Since the call is intended for the doctor and came in over contacts Y of connector 6, the ringing frequency would come in over the negative side of the line via negative conductor C23 to ringer 8 and ground, to ring this ringer only. Also, ringing relay 220 will respond in a manner previously described, to close a circuit to relay 230. Relay 230 in turn, will close a circuit to motor magnet 260 in a manner previously described. The remainder of the operations will be generally similar to that described with respect to incoming calls to Line 1, with the exception of different paths of operation. For instance, if four ringing periods have expired and no answer has taken place at residence Station B, the timer switch 270 will be in position 5 and relay 210 will operate over a circuit including contacts 274, 183, and 136 to ground, and a circuit to motor magnet 260 is closed over contacts 261, 273, 272, 183, and 136 to ground. It is to be understood that since ringer 8 rang at residence station B, the tone of ringer 8 being different than ringer 9 would designate that the call is intended for the doctor, and if it were known that the doctor was in his office, the call need not be answered, but a resident would wait for the timer to transfer the call to Line 1. Relay 210 operates, opening contacts 211 to open the ringing circuit to relay 220, and contacts 212 close ground via contacts 181 and CN lead C14 to mark Line 1 as busy, and operate relay 110 via contacts 122'. Motor magnet 260 by means of its contacts 261 will self-interruptedly step the cams C1–C4 to their respective sixth position to open at cam contacts 272 the circuit to motor magnet 260, and close a circuit to transfer relay 250 at cam contacts 271. The last circuit extending from battery, winding of transfer relay 250, cam contacts 271, contacts 183, and 136 to ground. Relay 250 operates, closing contacts 251 to operate the "transfer to Line 1 meter" via a circuit including contacts 131 and conductor MTR3. At contacts 252 and 253 the ringer 7 of the office Station A is closed in multiple with the ringer 8 of residence Station B, whereby both ringers will respond by ringing responsive to the fifth ringing period. The above operations will all take place before receipt of the fifth ringing period. The first station to answer will cut off the ringing.

If Line 1 is idle when Line 2 is called, but Line 1 becomes busy after relay 180 has already operated and before the cams reach position 5, ground on CN conductor C14 of Line 1 will operate relay 240 when the cams are advanced to position 4. This last circuit extending from battery, winding of relay 240, contacts 182, 275, 181, conductor C14 to ground via the control wiper of the incoming connector. Relay 240 will thus open the pulse circuit to the motor magnet so the timer 270 will not respond to the fourth ringing period. Thus, the transfer cannot be made to a busy line. If the party calling Line 2 should hang up without the call being answered and while Line 1 is still busy, relays 150 and 180 will restore, and relay 180 will restore relay 240. Relay 180 will close a self-interrupter circuit to motor magnet 260 to home the timer over a circuit including ground, contacts 136, 184, 278, 161, winding of motor magnet 260 to battery.

If the party calling Line 2 waits for an answer until Line 1 is free, removal of ground from CN conductor C14 of Line 1 will let relay 240 restore. The restoration of relay 240 will now permit relays 220 and 230 to close the circuit to motor magnet 260 at the next ringing period, and the transfer operation is initiated as previously described.

On incoming calls having a directory number corresponding to bank contacts Z on connector 6, the above operations would take place except that this is a normal residence call wherein the ringing frequency would be transmitted over the positive side of the line via positive conductor C24 to ring ringer 9. A resident at Station B would then know by the tone of ringer 9 that this is a non-business call and would answer the call. However, should said resident fail to answer the call after four ringing periods, the above-described transfer would take place, providing Line 1 is not busy, but since the ringing frequency is transmitted over the positive side of the line the ringer 7 would not respond since it is on the negative side of the line. Therefore, if the doctor were in his office at this time, the non-business call would not disturb him for unnecessary reasons. To avoid being confused as to whether the call is a business or non-business call by relying on the tones of the ringers, two separate telephones could be utilized at Station B, however, maintaining the same single line for both calls, but having ringers 8 and 9 in separate telephones. This way, the resident could tell whether the call was a business call or a non-business call by determining which telephone has been rung.

The invention having been described, that which is believed to be new and for which the protection of Letters Patent is desired will be pointed out in the appended claims.

What is claimed is:

1. In a telephone system; a pair of lines each having a ringer connected thereto; a line circuit common to both said lines; a source of interrupted ringing current; means for extending a calling connection, including said ringing current, to one of said lines and to said line circuit; said ringer associated with said one line being thereafter operated in response to receipt of said interrupted ringing current; ringing current responding means in said line circuit; means in said line circuit operated in response to said calling connection being extended thereto for further extending said connection to said ringing current responding means; said ringing current responding means operating in accordance with the receipt of said interrupted ringing current; and control means in said line circuit operated by each said operation of said ringing current responding means for extending said calling connection to the other of said pair of lines after the termination of a predetermined number of said responding means operations; said ringer associated with said other line thereafter operating simultaneously with said operation of said ringer of said one line in response to said last mentioned extension of said connection to said other line.

2. In a telephone system such as claimed in claim 1; wherein said last mentioned means includes timing apparatus operated by each said operation of said ringing current responding means for registering each of said responding means operation; relay means; means controlled by said timing apparatus after said registering of a predetermined number of said responding means operations for operating said relay means; and means operated by said operation of said relay means for connecting said calling connection with said other of said pair of lines.

3. In a telephone system such as claimed in claim 1; including busying means in said line circuit individual to said other line of said pair; means operated in response to said other line being taken into use, before said calling connection is extended thereto, for operating said busying means; and means operated in response to said operation of said busying means after a different predetermined number of operations of said control means for blocking said extension of said calling connection to said other line.

4. In a telephone system; an office line having a telephone subscriber station thereon; a residence line having a telephone subscriber station thereon; a line circuit common to both said lines; a source of interrupted ringing current; a first connector switch having access to said office line and a second connector switch having access to said residence line for extending calling connections thereto including said ringing current; means operated in response to the extension of a calling connection to one of said lines by one of said connectors upon receipt of said ringing current for signalling the corresponding subscriber station of an incoming call; means in said line circuit operated in response to said extension of said calling connection to said one line for extending said connection further into said line circuit; timing means intermittently operated in response to receipt of said interrupted ringing current received over said further extended connection for connecting said other line with said one line after the termination of a predetermined number of said intermittent timing means operations; and means operated in response to said connection of said other line with said one line upon receipt of said ringing current for signalling the other said subscriber station simultaneously with said signalling of said one subscriber station.

5. In a telephone system; a residence line having a first and a second ringer connected thereto; an office line having an office line ringer connected thereto; a common line circuit connected to both said residence and said office lines; a source of interrupted ringing current; means for selectively extending calling connections, including said ringing current, to said residence line to operate either said first or said second ringer in accordance with a first or a second selective extension; means in said line circuit operated in response to receipt of said ringing current received over a calling connection selectively extended to said first ringer on said residence line for registering the interruptions of said ringing current; and relay means in said line circuit operated in response to said registering of a predetermined number of said ringing current interruptions for connecting said office line with said residence line; whereby said office line ringer and said first ringer are thereafter simultaneously operated by said ringing current.

6. In a telephone system such as claimed in claim 5; including means in said line circuit operated in case said office line is taken into use, before said connection of said office line is made with said residence line, for disabling further operation of said last mentioned means to discontinue said registering of said ringing current interruptions.

7. In a telephone system wherein a common subscriber has an office line at one location and a residence line at a different location; said office line including a pair of line conductors having a first ringer connected to one of said conductors for signalling said subscriber thereover; said residence line including a pair of line conductors having a second ringer connected to the conductor corresponding to said one office conductor and a third ringer connected to the other of said conductors, each for signalling said subscriber thereover; a first and a second source of interrupted ringing current; first switching means for extending calling connections, including said first ringing current, to said office line to operate said first ringer; second switching means for selectively extending calling connections, including said second ringing current, to said residence line to operate either said second ringer in accordance with a particular selected extended connection or said third ringer in accordance with a different selected extended connection; common means in said line circuit; first individual means in said line circuit operated in response to the extension of a calling connection, including said first ringing current, to said office line by said first switching means for further extending said calling connection to said common means; said common means being thereafter operated in response to receipt of said first ringing current; connect means operated in response to a predetermined number of said operations of said common means for connecting said residence line with said office line; whereby receipt of said first ringing current over said existing connection simultaneously operates said first and said second ringers to signal said subscriber over both said office and said residence lines; second individual means in said line circuit operated in response to the extension of said particular selected calling connection, including said second ringing current, to said residence line by said second switching means for further extending said particular selected calling connection to said common means; said common means being thereafter operated in response to receipt of said second ringing current; said connect means operated in response to a predetermined number of said operations of said common means for connecting said office line with said residence line; whereby receipt of said second ringing current over said existing particular selected connection simultaneously operates said second and said first ringers to signal said subscriber over both said residence and said office lines, said second individual means operated in response to the extension of said different selected calling connection, including said second ringing current, to said residence line by said second switching means for further extending said different selected calling connection to said common means; said common means being thereafter operated in response to receipt of said second ringing current; and said connect means operated in response to a predetermind number of said operations of said common means for connecting said office line with said residence line; whereby receipt of said second ringing current over said existing different selected connection operates said third ringer to signal said subscriber over only said residence line.

8. In a telephone system such as claimed in claim 7; including residence line busying means in said line circuit; means operated in response to said residence line becoming busy, before said connection of said residence line with said office line, for operating said residence line busying means; blocking means operated in response to said operation of said residence line busying means after a different predetermined number of said operations of said common means for disabling said operation of said connect means to block said connection of said residence line with said office line; office line busying means in said line circuit; and means operated in response to said office line becoming busy, before said connection of said office line with said residence line, for operating said office line busying means; said blocking means operating in response to said operation of said office line busying means after said different predetermined number of said operations of said common means for disabling said operation of said connect means to block said connection of said office line said residence line.

9. In a telephone system, an office line having a first ringer for signaling a subscriber thereat, a residence line having a second ringer for signaling the same subscriber at a location remote from said office line, a line circuit, a first means in said line circuit individual to said office line, a second means in said line circuit individual to said residence line, and a third means in said line circuit common to both lines, said first means operated to prepare said third means for operation responsive to an incoming call to said office line, said second means operated to prepare said third means for operation responsive to an incoming call to said residence line, a source of interrupted ringing current transmitted on incoming calls to their line for intermittently ringing the ringer corresponding to the line called, said third means operated responsive to a predetermined number of intermittent rings for connecting an incoming call from said office line to said residence line or form said residence line to said office line depending upon the line being called, and said first and second means effectively operated to prevent the operation of said third means in the event one of said lines is busy at a time when said other line is being called.

10. In a telephone system, a first line having a substation and a first ringer thereon, a second line having a substation and a second ringer thereon, a line circuit, a first plurality of relays in said line circuit individual to said first line, a second plurality of relays in said line circuit individual to said second line, a timer switch in said line circuit comprising a plurality of predetermined stepped positions, a ringing relay in said line circuit common to first and second lines, a source of series of interrupted ringing current transmitted intermittently ring said first ringer and intermittently operated said ringing relay responsive to an incoming call to said first line and transmitted to intermittently ring said second ringer and intermittently operated said ringing relay responsive to an incoming call to said second line, circuit means controlled by each intermittent operation of said ringing relay for stepping said timer switch one step for each intermittent operation thereof, a transfer relay in said line circuit operated responsive to said timer switch being stepped to a first predetermined position to interconnect said first line to said second line to cause said first and second ringers to simultaneously ring responsive to the next series of interrupted ringing current transmitted regardless of which lines is being called, and disabling means operated responsive to an incoming call to said first line at a time when said second line is busy to disable said timer switch and prevent the transfer.

11. In a telephone system as claimed in claim 10, including a second disabling means operated to disable said timer switch responsive to said timer switch being stepped to a second predetermined position on an incoming call to said first line followed by an incoming call to said second line.

References Cited in the file of this patent

UNITED STATES PATENTS

| | | |
|---|---|---|
| 1,866,639 | Feind | July 12, 1932 |
| 1,905,711 | Hinrichsen | Apr. 25, 1933 |
| 2,312,385 | Burgener | Mar. 2, 1943 |
| 2,358,017 | Lomax | Sept. 12, 1944 |
| 2,718,560 | Alexandersson | Sept. 20, 1955 |
| 2,892,038 | Gatzert | June 23, 1959 |